US011790285B1

(12) United States Patent
Can et al.

(10) Patent No.: US 11,790,285 B1
(45) Date of Patent: Oct. 17, 2023

(54) LOW-CONTACT / NO-CONTACT EVENT MANAGEMENT FOR HYBRID IN-PERSON / VIRTUAL EVENTS

(71) Applicant: Hopin Ltd, London (GB)

(72) Inventors: Ahmet Can, Montclair, NJ (US); Kerem Baran, Miami, FL (US)

(73) Assignee: Hopin LTD, London (GB)

( * ) Notice: Subject to any disclaimer, the term of this patent is extended or adjusted under 35 U.S.C. 154(b) by 0 days.

(21) Appl. No.: 17/557,379

(22) Filed: Dec. 21, 2021

(51) Int. Cl.
  *G06Q 10/02* (2012.01)
  *H04W 4/80* (2018.01)
  *G06Q 30/0207* (2023.01)
  *G06V 40/16* (2022.01)

(52) U.S. Cl.
  CPC ......... *G06Q 10/02* (2013.01); *G06Q 30/0207* (2013.01); *G06V 40/172* (2022.01); *H04W 4/80* (2018.02)

(58) Field of Classification Search
  CPC ...................................................... G06Q 10/02
  See application file for complete search history.

(56) References Cited

U.S. PATENT DOCUMENTS

| | | | | |
|---|---|---|---|---|
| 2002/0092879 A1* | 7/2002 | Chrisman | ............ | B67D 1/0001 222/504 |
| 2003/0154169 A1* | 8/2003 | Yanai | .................. | G06Q 20/045 705/65 |
| 2013/0238392 A1* | 9/2013 | Sloan | ................. | G06Q 30/0207 705/7.29 |
| 2013/0282421 A1* | 10/2013 | Graff | .................... | G06F 16/9535 705/14.27 |
| 2016/0247145 A1* | 8/2016 | Grimaux | .............. | G06Q 20/387 |
| 2018/0025193 A1* | 1/2018 | Grimaux | ............ | G06K 7/10425 235/451 |
| 2018/0350171 A1* | 12/2018 | Weston | .................... | G07C 9/37 |
| 2021/0241560 A1* | 8/2021 | Soundararajan | .... | G06F 21/6254 |

FOREIGN PATENT DOCUMENTS

KR      20110056267 A   *   5/2011   ............. G06Q 10/02

OTHER PUBLICATIONS

Pakarinen, Taija, and Johanna Hoods. "From hybrid events to the next generation-interactive virtual events: Viewed from three different stakeholders' point of view." (2018). (Year: 2018).*

* cited by examiner

Primary Examiner — Emmett K. Walsh

(57) ABSTRACT

Programs, systems, and methods for facilitating low contact or no-contact registration, check-in, and attendance to an event. Registration is provided to an event virtually such that an attendee of the event may provide a single click registration or registration may be performed automatically be detecting, by a first sensor, the attendee and providing automatic registration. Automatic check-in to the event may be provided to the attendee by obtaining, by a second sensor, information indicative of the attendee and determining registration information from an attendee profile. The attendee may be provided access to event activities to which the attendee is registered. Furthermore, data associated with attendance at the event may be tracked and the attendee may be provided incentives based on the tracked data.

20 Claims, 6 Drawing Sheets

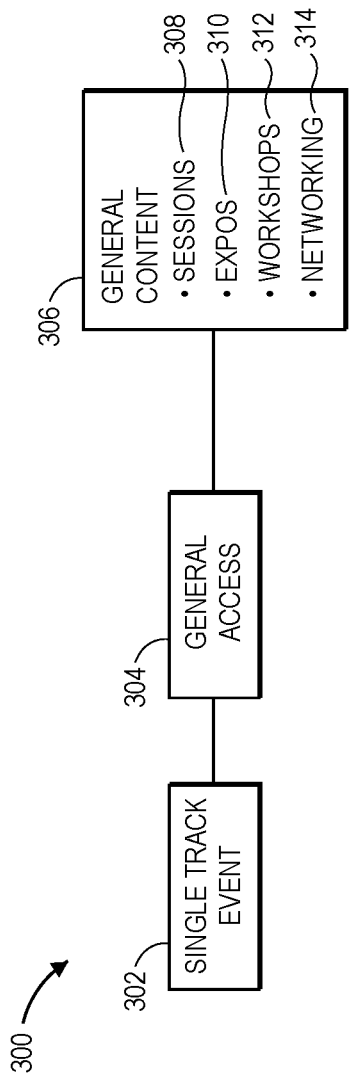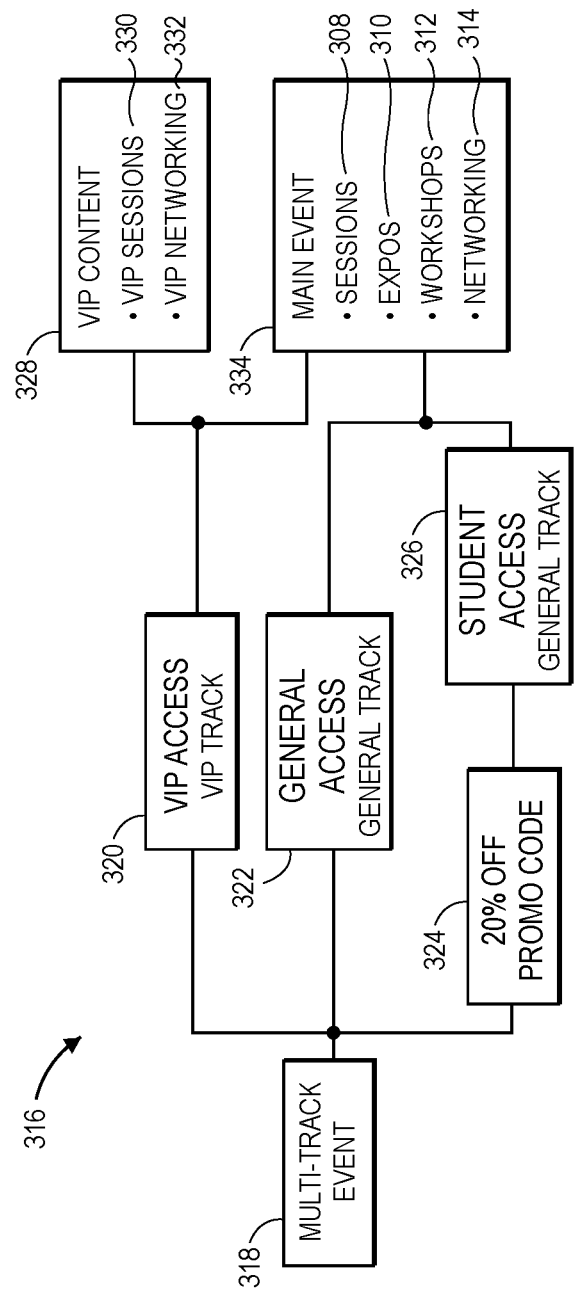

LOW-CONTACT / NO-CONTACT EVENT MANAGEMENT FOR HYBRID IN-PERSON / VIRTUAL EVENTS

BACKGROUND

1. Field

Embodiments of the instant disclosure relate to providing event management, including registration and check-in for hybrid, in-person, and virtual events. Specifically, embodiments of the instant disclosure relate to providing low-contact and no-contact registration and check-in for hybrid, virtual, and in-person events.

2. Related Art

Traditionally, people have attended conferences in person. The conferences may be provided at a centralized location and promote education and networking within an industry. Presenters may provide presentations at the conference that people may attend in person. The conference may provide opportunities for the attendees and the presenters to connect to advance the topics of the conferences. Furthermore, expos presenting and selling products may be constructed for quick and easy engagement with the attendees.

Typical conferences today present several problems. When attending virtual conferences attendees typically must be invited to the conferences activities and select a link or navigate to the home page of the conference. Once at the conference or activity page, the attendee then must manually enter the registration information to be given access to the conference activities. As such, the conference registration and attendance are fully manual and cumbersome for the attendee. Furthermore, there is no interaction provided for the attendee, causing a disconnect between the conference and the attendees.

When attending the conference events in person, by contrast, attendees must arrive at a particular time and wait at a kiosk, or front desk, while a conference representative checks each of the attendees into the conference. Again, there is no automated check-in and no personalization based on the individual needs of the attendee. As such, the attendee is does not receive a high-level experience that is possible by integrating technology into the registration, check-in, and attendance of these conferences.

What is needed is an event management system which provides event activities for virtual and in-person attendees to view presentations where attendees may engage the presenters and other attendees in follow up sessions and attend expos with contactless customized registration, check-in, and attendance. The contactless customized registration, check-in, and attendance can be provided to both virtual and in-person attendees.

SUMMARY

Embodiments of the invention solve the above-described problems by providing systems, programs, and methods for registration, check-in, and attendance to events that is customized with no contact or minimal contact. The attendees may attend the events virtually, in-person, or in a hybrid-type manner.

A first embodiment is directed to a method of facilitating registration and check-in for an event, the method comprising the steps of receiving, by a user interface and for an attendee, the registration for the event, wherein the registration comprises a ticket allowing access to various event activities of the event, storing registration information and attendee information on an attendee profile associated with the attendee, receiving, by a sensor and without physical contact, data indicative of the attendee, comparing the data indicative of the attendee with the attendee profile, and providing the access to the attendee to the event activities at the event based on the registration information and the attendee information.

A second embodiment is directed to a one or more non-transitory computer-readable media storing computer-executable instructions that, when executed by a processor, perform a method of facilitating registration and check-in for an event. The method comprises the steps of receiving, by a user interface and for an attendee, the registration for an in-person event, wherein the registration comprises a ticket allowing access to various event activities of the event, storing registration information and attendee information on an attendee profile associated with the attendee, receiving, by a sensor and without physical contact, data indicative of the attendee, comparing the data indicative of the attendee with the attendee profile, and providing the access to the attendee to the event activities at the event based on the registration information and the attendee information.

A third embodiment is directed to a system for providing virtual registration and access to an event. The system comprises a processor, a data store, a sensor for obtaining data indicative of the attendee, and one or more non-transitory computer-readable media storing computer-executable instructions that, when executed by the processor, performs a method of facilitating the virtual registration and virtual check-in for the event. The method comprising the steps of receiving, by a user interface and for an attendee, registration for the event, wherein the registration allows access to event activities of the event, storing registration information and attendee information on an attendee profile associated with the attendee, receiving, by the sensor and without physical contact, data indicative of the attendee, comparing the data indicative of the attendee with the attendee profile, and providing the access to the attendee to the event activities at the event based on the registration information and the attendee information.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 3A depicts an exemplary flow for a single-track event;

FIG. 3B depicts an exemplary flow for a multi-track event;

Figure 1:
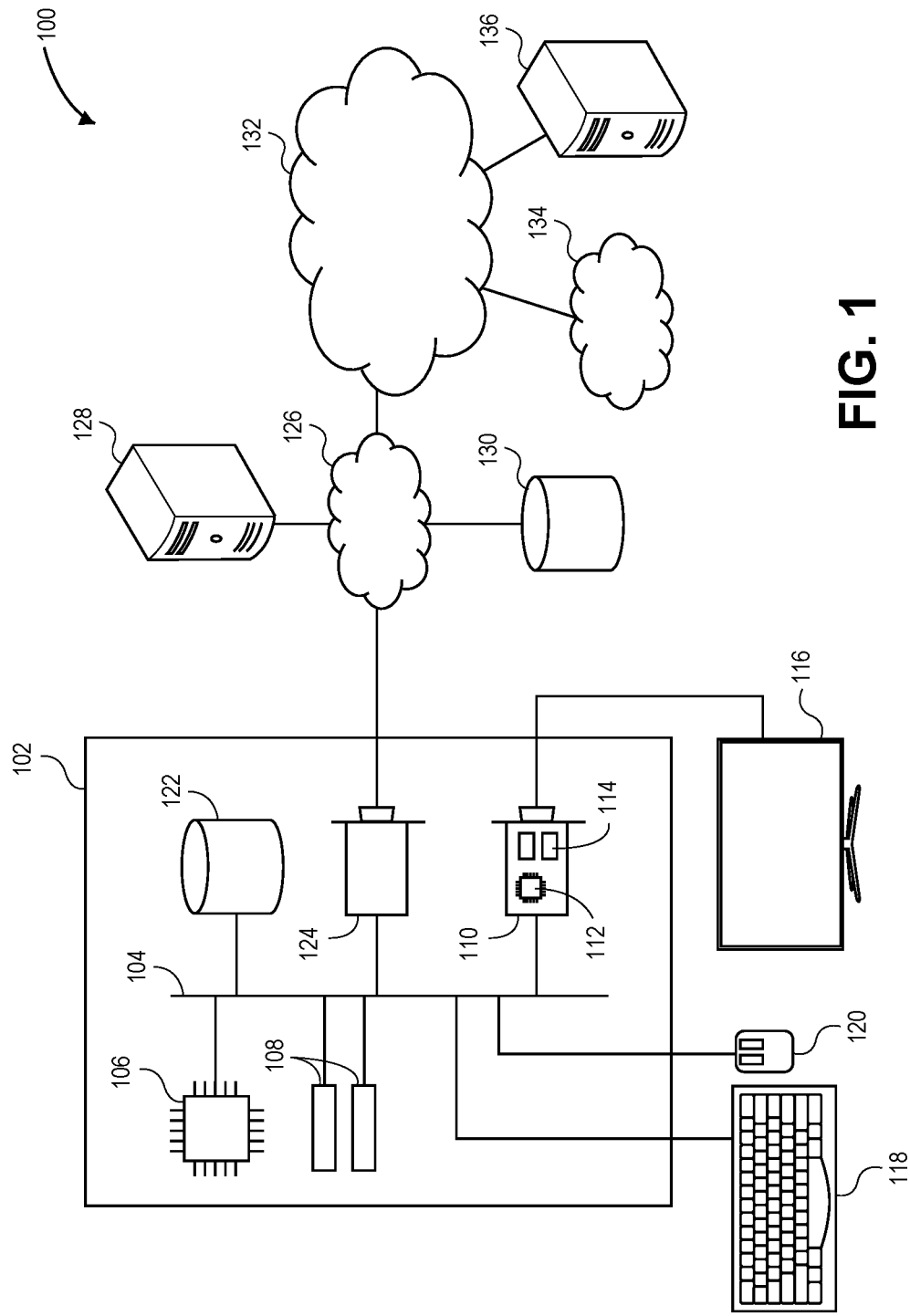
FIG. 1 depicts an exemplary hardware platform for embodiments of the description.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the invention are directed to an event hosting system for providing virtual events connecting presenting users of virtual events, in-person events, and hybrid events with attendees of the virtual events, in-person events, and hybrid events. The event hosting system may be operable to receive input from the user scheduling and customizing an event for presenting users to present or perform to users that attend the event. In some embodiments, the user that creates the event may be referenced as the event creator or the organizer and the user that attends the event may be referenced herein as the attendee. In some embodiments, the attendees may attend the events in-person or virtually and access the event hosting system at any time. The event creator may also be a presenting user and/or an attendee. In some embodiments, the organizer may also be a presenter at the event. Any user may attend, present, host, and create events.

In some embodiments, the events may be conferences hosted by companies or a plurality of companies providing workshops. The events may associated with a particular field such as, for example, beauty. A plurality of beauty companies may reserve stages, both in-person and virtually, for presenting products and advancements in the field. Some events may be conferences for advancements in technology or continued learning such as medical conferences where certifications for attending the events may be provided. Upon completion of the event, documents for certification may be provided requiring the attendees in-person signature or electronic signature on digital documents. The digital documents may be provided by the event hosting system or by an integrated application provided by a third-party source.

In some embodiments, events may be library events featuring new books or read-a-longs for children. Some events may be provided for public school boards to meet virtually with parents or for school teachers to meet with students. The networking engagements described herein may be one-on evaluation or tutoring periods. Any virtual or in person meeting that may be imagined may be supported by the event hosting system as described in embodiments herein.

In some embodiments, events comprise a plurality of communication connections between presenters and attendees. Events may comprise event activities including stages, sessions, networking engagements, workshops, expos, and any other platforms for connecting presenters, sponsors, attendees, and any other user that has access to attend the event. In some embodiments, any user that has access to attend any part of an event either in-person or virtually may be generally referenced as an attendee; however, in some embodiments described below, in-person attendees and virtual attendees are distinguished. Stages may provide a virtual platform for presenters to present to an audience of attendees via a live (or time-shifted) broadcast. The attendees may attend the stage virtually via a user interface comprising a video display or in-person at the location of the stage. The user interface may allow the attendee access to view the presentation live or recorded and chat with other attendees and the presenter by text, audio, and video communication.

In some embodiments, the event comprises one or more sessions. The sessions may allow attendees to communicate directly with a presenter via one or more video interfaces. An attendee may provide audio and video such that the presenter and other attendees may hear and see the attendee. Generally, the sessions may provide a virtual communication platform for providing question and answer sessions between the attendees and the presenting users.

In some embodiments, the event includes networking opportunities. The network opportunities may provide time-limited communications between attendees at the events. The attendees may be connected to other attendees randomly or the connections may be pre-selected by an organizer or by the attendees. The attendees may connect by the video interface described in embodiments herein.

In some embodiments, the event includes one or more expos in which sponsors may promote products and services provided by the sponsors. The expos may be virtual booths for presenting information on exemplary topics such as company future expectations, products, services, and any other information that may be useful in traditional expo format. The expos may be provided by the user interface and may display any video, images, descriptions, and may include third-party application integrations for engagement by the attendees.

In some embodiments, the virtual event hosting system may track user interactions within the virtual events and integrate with applications of mobile devices to track user locations when the user is attending an event in person or virtually. The application may provide virtual event analytics to the event creator or organizer, data customer and data brokers, and offer customized scheduling to attendees based on a user profile and the user interactions to provide a customized user experience.

In some embodiments, the event hosting system may provide no, or minimal, contact registration and check-in.

The event hosting system may provide a graphical user interface (GUI) to present registration options for events to be attended in person or virtually. The registration options may include access to event activities such as stages, sessions, workshops, network connections and expos, at various prices. The registration options may be presented by the GUI to a potential attendee. The potential attendee may select any of the registration options and submit an electronic payment to register for the event. In some embodiments, registration for the event may take place with no contact between the registering attendee and any event representative. The process of registering for an event may be completely contactless or require very little contact. In some embodiments, the registration is associated with a user profile, an organization profile, and/or an event registration profile such that the user may attend from any location on-site or virtually without submitting a ticket in-person. The registration process is described in detail below.

Upon registration for the event the attendee may receive numbers, codes, or any other information that may be indicative of the registration of the attendee. The information indicative of the registration may be used to create user credentials, cards, QR codes, bar codes, coded signals, and the like that may be used to enter the event. Cards may be printed by the attendee prior to attending the event or may be provided to the attendee upon arrival at the event.

In some embodiments, the event hosting system may provide no, or minimal, contact check-in by using profile information associated with the attendee along with registration information associated with the attendee. Check-in for virtual, in-person, and hybrid events may be accomplished by the event system by receiving password information, receiving short-range signal associated with the attendees, capturing images, and performing facial recognition, as well as various other techniques to determine an identity of the attendees and against registration profiles. The check-in processes are described in detail below.

FIG. 1 illustrates an exemplary hardware platform 100 for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

In some embodiments, computer 102 may be generally referenced as an event hosting system. The event hosting system may be a web- or cloud-based application and may be provided on any computing device described in reference to computer 102 above. The event hosting system may access other computer devices, sensors, and applications stored on other computing devices as well as peripheral devices. The event hosting system may track user actions when interfacing with the event hosting system by accessing various applications associated with computer 102. In some embodiments, any data and access may be customized by the attendee. Furthermore, the event hosting system may access any applications stored on the mobile device of the attendee for attendance data to provide the attendee with a customized user experience.

Event Registration

Figure 2:
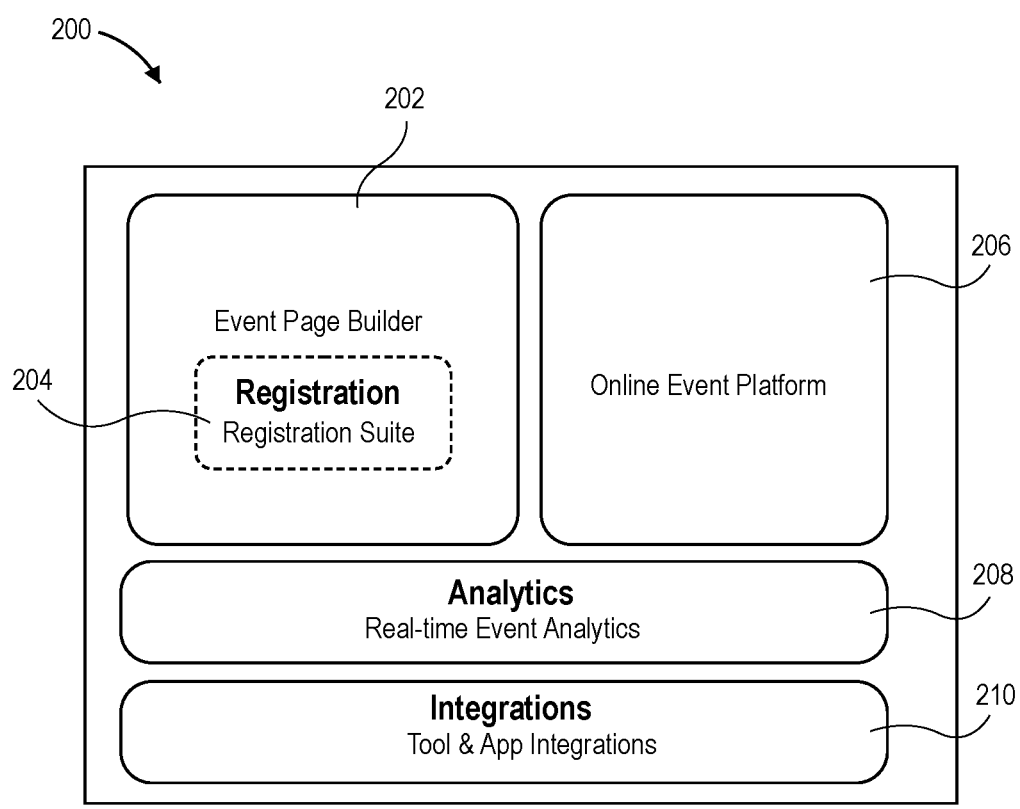
FIG. 2 depicts an exemplary registration diagram.

FIG. 2 depicts a creator diagram 200 for creating registrations and managing attendee information by the host user for an event. The host user may create and customize registrations by registration suite 204 by accessing event page builder 202. The host user may access and customize event platform 206 where the host user may customize how the events are presented to attendees. Furthermore, the host user may access and customize analytics 208 and tool and app integrations 210 as describe in more detail below.

In some embodiments, the event hosting system may provide quick and effortless contactless payment for event registrations and for event activities at the events by registration suite 204. Registration suite 204 may provide quick and easy registration to a plurality of events and a plurality of event activities at each event. Furthermore, registration suite 204 may provide a single location for management of event registrations and attendee customizations.

In some embodiments, an attendee may register for an event directly on the attendee's home page or the home page of the event by a registration page which may be customized by the host user or selected from a plurality of registration page templates. The attendee may provide payment by a stored account or as a guest by providing account information. The stored account may be associated with the user profile. As such, the user may simply indicate that the user wishes to purchase an item or registration and the cost of the item or registration may be submitted for payment. The account may automatically be deducted the cost of the item or registration. In some embodiments, the account is a prepaid or postpaid financial account held by a third-party financial institution. In some embodiments, the account may be a prepaid or postpaid financial account stored with the attendee profile that may collect debt associated with the cost of the items and registration and the attendee may pay off the debt with an associated account.

In some embodiments, the attendee may register for events in person at the site of the events. The attendee may walk into an event and register for the event at any entrance point to the event. The attendee may access a computer provided by the in-person/hybrid event or the user may access their own personal mobile device. The mobile device may provide the attendees location such that the attendee may automatically be registered for the event based on the location or the attendee may be prompted to answer a few questions to register for the event. In some embodiments, the attendee may register for the event by communicating with an event representative that registers the attendee.

In some embodiments, the attendee may set up the attendee profile. The attendee profile may comprise information indicative of the attendee such as name, identification number, contact information, likes, dislikes, and biometric information such as image, iris, fingerprint, palmprint, and any other biometric information that may be used to identify the attendee. Any registration and analytics data associated with the attendee may be stored at and accessed from the attendee profile. The data stored in the attendee profile may be used to verify the identity of the attendee for contactless check-in to the event as well as for easy registration and payment for future events.

In some embodiments, refunds may be provided by the event hosting system. The attendee may request a refund by the GUI and receive a refund to the account associated with the attendee profile. The refunds may be processed in the attendee of or on an attendee page of the GUI. The refunds or the availability of refunds may be based on the ticket type purchased by the attendee.

In some embodiments, the event hosting system may provide for managing any information associated with the attendee by the host user. Any information associated with the attendee may be managed such as, for example, registrations, tickets, refunds, waitlists, analytics, polls, and the like. Any information associated with the attendee may be displayed by an attendee dashboard. For example, if the attendee is attending the event and finds a session that the attendee is not eligible to attend based on the purchased ticket, the attendee may upgrade the ticket by the attendee dashboard provided by any desktop or mobile application. The attendee may upgrade or change any ticket and registration information in real time prior to or during the event.

In some embodiments, the registered attendee may receive registration confirmation. The registration confirmation may be stored in the profile of the attendee along with registration information. The registration confirmation may also be sent to any contact information stored on the attendee profile or provided by the attendee. In some embodiments, the registration confirmation may be sent as text, email, audio, video, or any other media format for transmitting information. The registration confirmation may also include any registration information such as location, date, time, ticket information, and the like. In some embodiments, the registration confirmation includes an electronic ticket such as a QR code, a barcode, or any digital or analog information that may be transmitted by short-range communication (e.g., BLUETOOTH or Radio Frequency Identification (RFID)).

In some embodiments, notifications of registration closure and event closure may also be sent to the attendee. The notification of registration closure date may be sent to potential attendees to provide a timeline to register for the event and purchase tickets. In some embodiments, leading up to the deadline to purchase the tickets, reduced-priced tickets may be provided when tickets remain unpurchased. Furthermore, when registration is closed, a notification of closure may be sent along with advertisements for other upcoming events.

In some embodiments, events may be created by the event host with a limit on the number of attendees. The price of the tickets may be associated with the demand for the tickets and the number of available tickets. Furthermore, various ticket types may be purchased that allow the attendee to attend various event activities which is discussed in more detail below.

In some embodiments, attendees may register to be added to a waitlist. Event activities, such as sessions, expos, workshops, and the like, may have a limit on the number of attendees. As such, a waitlist may be provided when, for example, an event is full, or the tickets are sold out. The waitlist may include any potential attendees that registered after the full event and selected to be added to the waitlist.

In some embodiments, attendees may select group purchases to add a plurality of attendees for registration. The plurality of attendees may be associated with any group or organization already registered and each member of the group may be associated with an individual profile and/or a group profile. In some embodiments, the attendee may register the group and each member is provided registration. In some embodiments, different members of the group may be registered with different tickets that may provide different event activities for those particular attendees. For example, a group including engineers may receive tickets to a technology session whiles marketing analysts of the same group may be provided tickets to a marketing session. The ticket types may be provided to each member based on the member profiles. In some embodiments, individual members may be registered with or without previously created profiles. A single attendee may purchase a plurality of tickets for a plurality of attendees and only provide low-level attendee information such as, for example, name and contact information. In some embodiments, a limit may be placed on the number of tickets that may be purchased in bulk.

In some embodiments, promotional codes may be created and generated for each ticket type or depending on the attendee profile. The promotional codes may be created to provide specific pre-event marketing campaigns. The pre-event marketing campaigns may be presented during other events and through third-party websites. In some embodiments, the promotional codes may be presented based on the amount of time before registration is closed as described above. In some embodiments, promotional codes may be provided to specific groups such as, for example, students, companies, low-income groups, and the like.

In some embodiments, widgets may be embedded on third-party sites to allow registrations through the third-party sites. As described above, the third-party sites may promote events and data from the third-party site may be stored. When a user of the third-party site views and selects the promotion, the data may be stored for analysis. The third-party views, view duration, and clicks may be stored for analysis and compared to other third-party sites. Furthermore, the user may elect to register for the event through the third-party site or by selecting the third-party promotion and being redirected to the event hosting system. As such, the third-party site may receive percentage of the registration fee for finding and/or signing the new attendee.

In some embodiments, tracking codes such as Urchin Tracking Module (UTM) codes may be used to track the pre-event marketing campaigns. The UTM codes may be created, tracked, and managed directly in a main page or dashboard of any event by the event hosting user. The pre-event marketing data collected may be used to optimize marketing or events. For example, particular current events and third-party sites may be targeted for promoting future events based on a history of marketing and on a relationship between the current events and the event being promoted. For example, an event for beauty products may be promoted across a plurality of events; however, it may be found that the most registrations occur at one particular home décor event. As such, the promotions may be reduced at the other events and increased at the home décor event.

FIGS. 3A and 3B depict exemplary alternative tracks for event registration. The attendee may register for a plurality of event activities either customized by the attendee or the host user. As such, FIGS. 3A and 3B depict examples of event tracks that may be purchased by the attendee. FIG. 3A depicts an exemplary single-track registration flow 300 for single-track event 302. In some embodiments, the attendee may register for single-track event 302 by purchasing a single-track event ticket. The single-track event ticket may provide general access 304 to single-track event 302. Single-track event 302 may comprise general content 306 including any event activities such as, for example, sessions 308, expos 310, workshops 312, networking 314, and any other event activities that may be created for single-track event 302. The attendee of single-track event 302 may attend all event activities as there is only a single access level for attending the event activities in the single-track event 302.

In some embodiments, sessions 308 may be virtual presentations where attendees may interact with other attendees and the presenting users of single-track event 302. Sessions 308 may comprise two-way open communication between attendees and the presenting users. In some embodiments, single-track event 302 may comprise a plurality of presenting users at a plurality of sessions and attendees may be scheduled to attend the plurality of session on location or virtually. In some embodiments, sessions 308 may only be virtual and may be provided through the event hosting system allowing access to the presenting users and the registered attendees. The event hosting user may create various sessions with promotional images, descriptions, registration restrictions, orders, and the event hosting user may be allowed to add and remove sessions 308. Any number of sessions 308 may be set up for virtual or live events and may be recorded and edited for future viewing by attendees that register to view the events in the future or by attendees during the event.

In some embodiments, the event hosting user may create and edit expos 310. Expos 310 may comprise in-person and/or virtual booths presented to registered attendees of the event or publicly to any attendees as decided by the hosting user. The booths may comprise any video, images, text, sponsorships, and third-party applications that may be available and be presented to the attendees by the event hosting system. The event hosting user may input any booth owner or presenter information for contact by the attendees. Furthermore, any images, videos, or promotional content from the event hosting user or booth owner/presenter may be uploaded for presentation at the booth in expos 310. The booth owner may integrate with social media, online documents, and any other presentations through any integrations.

In some embodiments, the event hosting system may provide workshops 312. Workshops 312 may be provided at the in-person event or may be entirely virtual. Workshops 312 may be learning experiences devoted to teaching attendees the topic of the workshop. The attendees may either attend workshops 312 in person or may attend virtually as described in embodiments below.

In some embodiments, the attendee may register for networking 314 and, in response, the virtual event hosting system may present a list of attendees that the user may message to request communication. In some embodiments, the virtual event hosting system automatically connects the user to attendees for networking 314. In some embodiments, the connections may be random or may be based at least in part on historical data, profile data, registration data, and any virtual event analytics as described above. In some embodiments, networking 314 may be provided by ticket type or by individual purchase.

FIG. 3B depicts an exemplary multi-track registration flow 316 for multi-track event 318. Multi-track event 318 may provide a plurality of registration options providing a plurality of access, or admission, options. As shown in FIG. 3B, the attendee may register for either VIP access or general access; however, many more access levels may be provided such as mid-level access or access to individual event activities. Any combination of event activities may be provided by different access levels which may be customized by the event hosting user or requested by the attendee. Broadly speaking, any custom access options may be available to the attendee.

In some embodiments, the attendee may provide signatures for documents associated with the various tracks. Registration of each event may come with a set of documents for signing by the attendee. The documents may be provided in hardcopy form at the entrance to an in-person or hybrid event, or may be provided as a digital copy. In the case of a hardcopy, the document may be sent to the attendee by mail prior to attending the event or the document may be provided at the entrance to the event. In the case of a digital copy, the document may be provided by email or on the attendee's profile such that the attendee may provide an electronic signature. The document and the electronic signature may be provided by the event hosting system directly or an integration providing the electronic document and signature.

In some embodiments, various documents may be provided based on the type of attended. As such, the attendees may receive different documents based on registering to the various tracks (e.g., VIP, general). Because the various tracks comprise different levels of access to events, stages, sessions, and networking, different documents may be provided for each different track or each different attendee. For example, documents may request information from the attendee such as name, date of birth, reasons for attending the event, what the attendee would like to get out of the event, and the like. In some embodiments, documents may be legal documents such as waivers, statements of certificates, statements of citizenship, or statements of legal standing.

In some embodiments, documents may be provided based on the profile of the attendee or a status of the virtual/hybrid event. For example, a session may be a military session and may be reserved for attendees that have a minimum security clearance. The attendee may provide documentation and sign documents stating that the attendee meets the minimum requirements for entry into the event. Furthermore, the documents and the information provided by the attendee may be provided to any agency for review of the documents.

In some embodiments, VIP access 320 may provide access to VIP content 328 to the attendee which has registered as a VIP attendee but not to the attendee who has registered for the general access track. The VIP attendee may attend any event activities as well as attending special event activities as part of VIP content 328. VIP sessions 330 may be popular sessions such as, the keynote at a conference, or a question-and-answer session with the keynote after the keynote presentation. Furthermore, VIP sessions 330 may provide a one-on-one with the keynote or other presenters at multi-track event 318. VIP sessions 330 may comprise any sessions that are not available under registration to general access 322 and, as such, may be purchased at a higher price or may only be provided to exclusive attendees. VIP sessions 330 may be popular sessions that have a limited attendance, sessions that the VIP attendee can select without restriction, or sessions that are selected for the attendee in a guided attendance.

In some embodiments, VIP networking 332 may provide the VIP attendee access to presenters that non-VIP attendees cannot access. The VIP attendance registration may specify extended time periods for networking with certain other attendees or presenters. Furthermore, the VIP attendance registration may allow the VIP attendee to have one-on-one contact with other attendees and presenters. In some embodiments, the VIP attendee registration may provide the VIP attendee with the ability to select networking contacts while general attendee networking contacts are generated randomly.

Alternatively, registration providing general access 322 may be selected by the attendee. As such, the attendee may be a general attendee. The general attendee may be provided access to the general content or main event content 334 of the event. For example, the general attendee may be allowed to access any sessions 308, expos 310, workshops 312, and networking 314; however, the general attendee may not access the VIP content 328 described above.

In some embodiments, student attendees may register using a promotional code such as promotional code 324. As depicted, students receive a 20% discount for selecting general student access 326. The discount afforded student attendees may be any amount including free registration. Various registration prices may be offered for students based on the event category as well as the student level and student interests. For example, an engineering student may receive a 50% discount to a technology summit. Similarly, an engineering student that has an academic paper published with a host organization of the technology summit may receive a 70% discount. Any discount amount may be imagined based on any attendee profile of the student attendee and the registration for multi-track event 318. Similarly, the student attendee may access any of the main event content 334 of general access. Promotional codes 324 may be applied for any attendee or group as described in embodiments above.

The event hosting system may access profile information to automatically register attendee and recommend upcoming events that the attendee may find interesting based on the attendee profile. The event hosting system accessing the attendee profile may also facilitate contactless and efficient check-in and event attendance as described in embodiments below.

Event Check-In and Attendance

In some embodiments, the attendee may conduct contactless, or minimal contact, check-in to the event. The attendee may check into the event using the computer or the mobile device connected to the Internet. The attendee may check into the event prior to the event or upon arrival and the attendee may automatically be checked in by a plurality of methods. For example, the attendee may arrive at the event in person and the attendee's arrival may be detected by sensors such as GPS receivers, RFID readers, BLUETOOTH transponders, biometric scanners, or any other sensors that may detect the attendee.

In some embodiments, the event hosting system may interface with sensors and may integrate with third-party applications that integrate with sensors such as GPS receivers, RFID readers, QR code readers, biometrics scanners, optical sensors, proximity beacons, and the like. The event hosting system may receive the sensor data and compare the sensor data with information indicative of the identity of the attendee and the registration of the attendee. The information indicative of the identity of the attendee may be associated with the attendee profile and the registration information. Similarly, the registration information may be stored on the attendee profile and may be used to allow access to the attendee to the event activities to which the attendee is registered.

Figure 4:
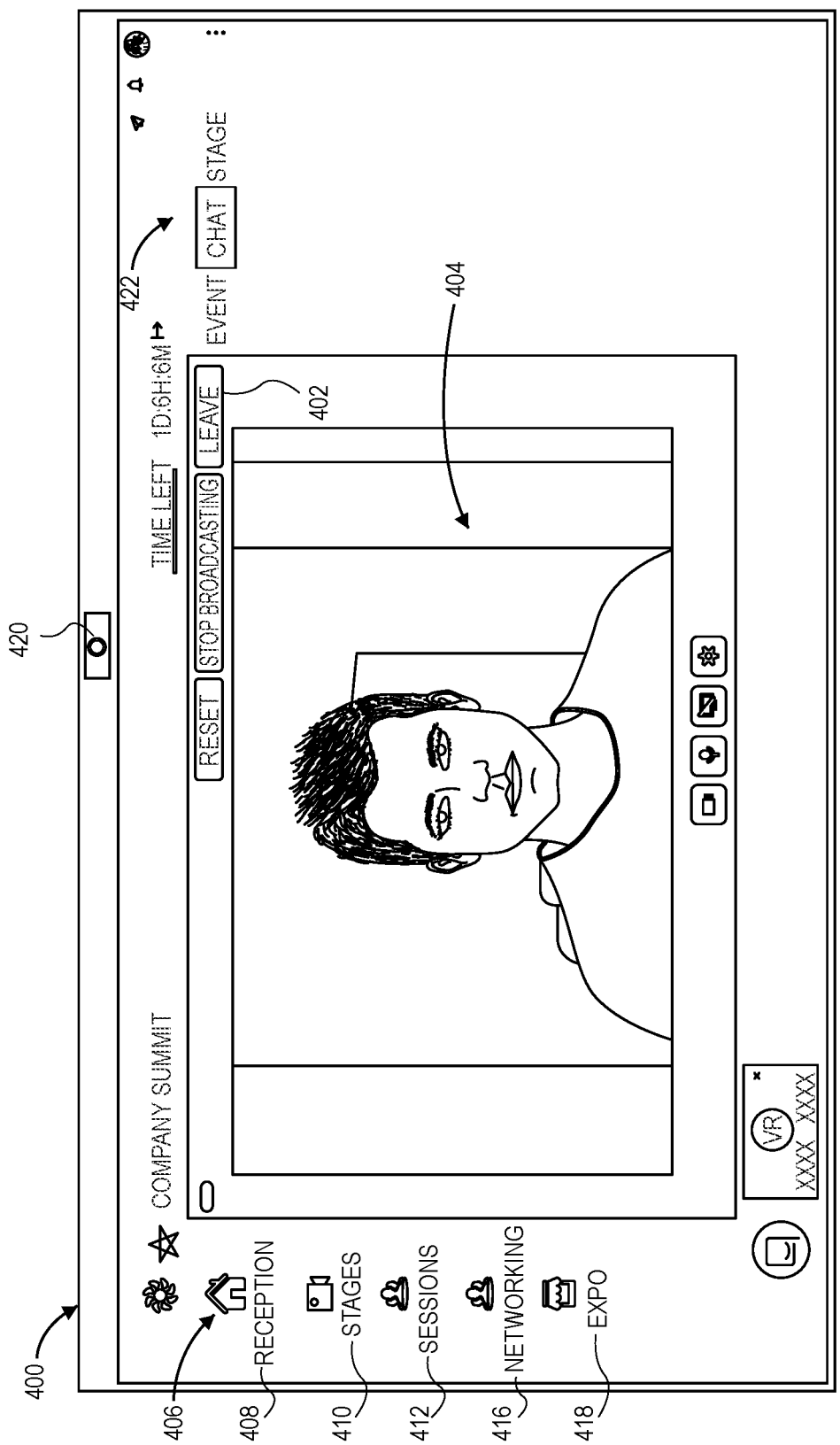
FIG. 4 depicts an exemplary virtual attendance interface.

In some embodiments, as depicted in FIG. 4, the attendee may check into a virtual event provided on the event hosting system by selecting a check-in/leave button 402. The presenting user may be displayed on display 404 of interface 400 presented by the event hosting system. The attendee may select various event activities on menu 406 to attend based on the registration type. For example, the attendee, as depicted in FIG. 4, may attend reception 408, stages 410, sessions 412, networking 416, and expo 418. Furthermore, the virtual attendee may elect to join a question-and-answer session and/or a networking connection with another attendee or presenter and elect to be displayed using virtual attendee's camera 420. As such, the attendee may be displayed to the other attendees and the presenting user by the event hosting system.

In some embodiments, the virtual attendee may wish to remain anonymous or may allow other attendees to see that the virtual attendee has checked into the event. In some embodiments, attendees may be notified of other attendees' entrance into the event. The virtual attendee may open the event on the mobile application or on any computer as described above and the event hosting system may automatically check the virtual attendee profile and registration information and determine that the virtual attendee is registered for the event. For example, the attendee may allow access to the event hosting system to virtual attendee's camera 420. The event hosting system may capture an image of the virtual attendee via virtual attendee's camera 420 and compare the image to the attendee profile. Once the attendee profile image is matched to the captured image, the virtual attendee may be allowed access to or be automatically admitted to the event activities to which the virtual attendee is registered.

In some embodiments, the virtual attendee may chat with other attendees via a chat field 422. The chat field may provide communication between attendees and/or presenting users during any event activities. In some embodiments, if virtual attendee wishes to remain anonymous or not be seen, chat field 422 allows virtual attendee to communicate with other attendees and presenting users.

In some embodiments, virtual attendees may be tracked to determine time spent at each event activity as well as levels of interest during the event activities. The event hosting system may determine the level of interest of the virtual attendee based on the attendee's interaction with the mobile device or computer during the event as well as through chat interactions with other attendees and through questionnaires.

Figure 5:
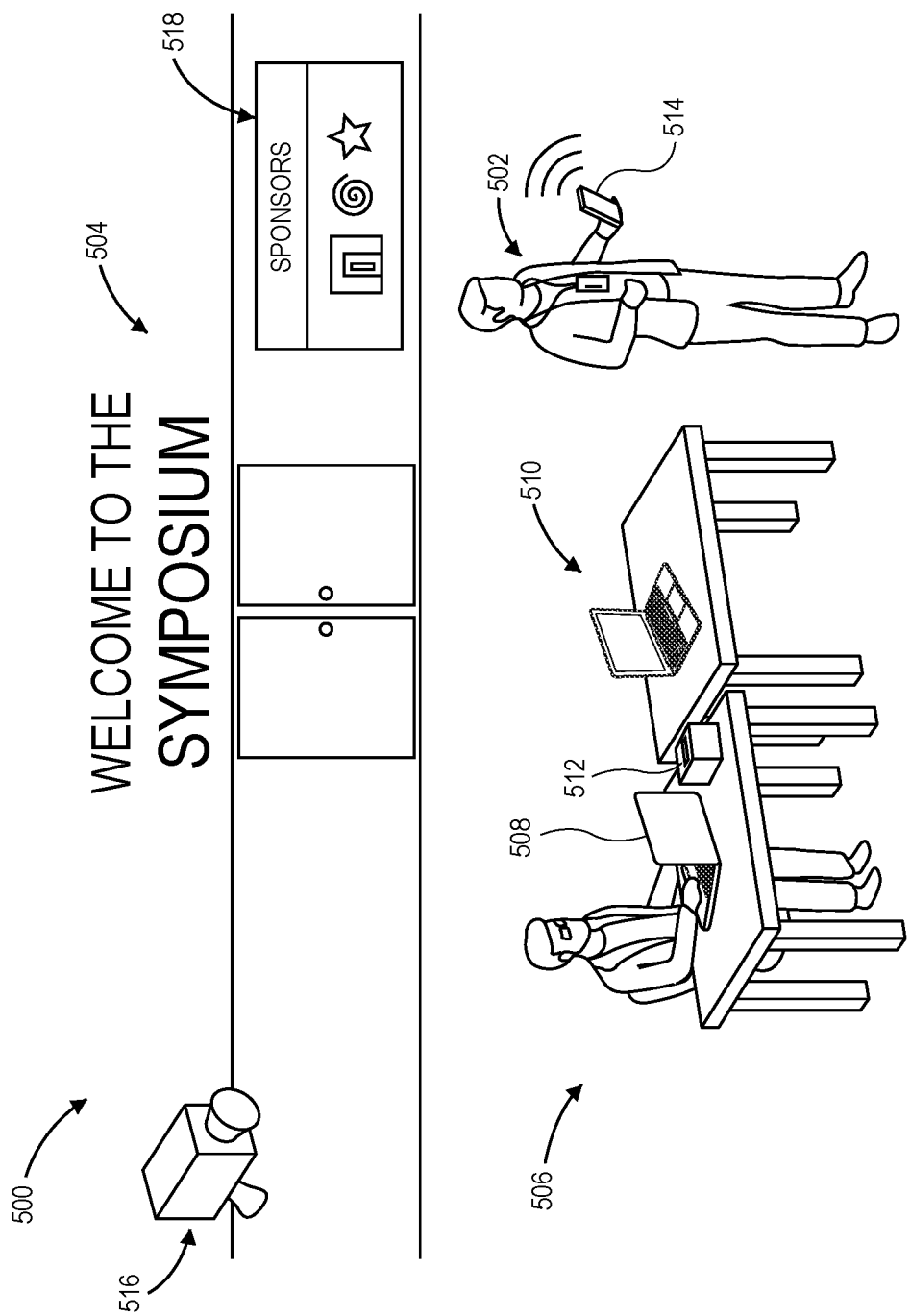
FIG. 5 depicts an exemplary system for attending an in-person event.

In some embodiments, the attendee may attend the event in person as depicted in the exemplary in-person event 500 presented in FIG. 5. The in-person attendee 502 may check into the in-person event 500 prior to arrival at the in-person event 500. In some embodiments, the in-person event may be a hybrid event and the attendee may be physically attending the in-person event but may attend any event activities and communicate with other attendees and presenting users virtually by the event hosting system. Similarly, in-person and virtual attendees can attend the same event, attend the same sessions presented by the (virtual or in-person) presenter, and network with other attendees, regardless of type. For example, the attendee may check-in in person, via the mobile application, or by any computer or any methods described herein. The attendee may simply select a time and date for arrival so that the in-person event organizers will be expecting the attendee's arrival. In some embodiments, the attendee may check in anytime before the attendee arrives at the event. Similarly, the attendee may check in upon arrival at the in-person event 500 by the same method.

In some embodiments, in-person attendee 502 may check into in-person event 500 at a desk or podium at the in-person event. In-person attendee 502 may approach a check-in counter at in-person event 500 and may check in with event representative 506 using event computer 508, computer 510, or a sensor 512. In-person attendee 502 may show a ticket to event representative 506 at the check-in counter, and event representative 506 may access the event hosting system and check in in-person attendee 502. In some low-contact or no-contact embodiments, computer 510 may be available for in-person attendee 502 to perform a self-check-in or registration by accessing the event hosting system on event computer 508. Any tickets, QR codes, bar codes, short-range signals that in-person attendee 502 presents for authorization to access the in-person event may be provided by the event hosting system upon registration as described in embodiments above.

In some low-contact or no-contact embodiments, in-person attendee 502 may scan a card or a ticket. The event hosting system may interface with sensors such as, for example, sensor 512 which may be a magnetic card reader. The magnetic card reader may read a magnetic strip on the card or ticket that provides information associated with the ticket purchased by in-person attendee 502 and, thus, provides registration information. As such, in-person attendee 502 registration is validated and approved without requiring contact with event registration staff. Alternatively, when the ticket is scanned, information associated with in-person attendee 502 such as, for example, the stored image of in-person attendee 502, a registration number, an identification number, and the like, may be presented to event representative 506 for identify verification.

In some embodiments, sensor 512 may present a QR code or may receive a QR code from in-person attendee 502. When in-person attendee 502 scans the QR code, the QR code may be presented at the kiosk, at the entrance to symposium 504, or anywhere on location. In-person attendee 502 may open the mobile application of the mobile device and scan the QR code to verify registration and check into in-person event 500. The QR code may provide information indicative of in-person event 500 such that check-in is automatically performed by the event hosting system when the attendee scans the QR code. The event hosting system may obtain the event information from the QR code and access the attendee profile and registration information and check the registration status of in-person attendee 502. When the registration status of in-person attendee 502 is verified, the event hosting system may check in in-person attendee 502 at in-person event 500, thus, providing in-person attendee 502 access to event activities for which in-person attendee 502 is registered.

Similarly, the event hosting system may interface with sensor 512 which may be a short-range communication sensor such as, for example, a BLUETOOTH transceiver, an RFID tag, or a proximity beacon. In some embodiments, in-person attendee may transmit short-range communication by a proximity card or mobile device 514 such that sensor 512 detects in-person attendee 502. The signal sent from in-person attendee 502 may be indicative of the ticket registration or the identity of in-person attendee 502 such that detection of the transmitted signal is indicative that the associated in-person attendee 502 has arrived at in-person event 500. Sensor 512 may be integrated with the event hosting system (for example, into an event badge) such that the event hosting system may obtain the registration and ticket information and/or in-person attendee 502 identity information and check in in-person attendee 502 to in-person event 500. Therefore, in-person attendee 502 may automatically be checked in upon arrival to in-person event 500.

In some embodiments, mobile device 514 may be used to register in-person attendee 502 to the event. In-person attendee 502 may walk into the event without registration and register for the event while in the lobby via computer 510 or mobile device 514. In some embodiments, the location of the user is provided by mobile device 514, sensor 512, or camera 516, and the event hosting system recognizes that in-person attendee is not registered. The event hosting system may then prompt in-person attendee 502 to register for the event or automatically registers in-person attendee for the event. In some embodiments, in-person attendee 502 may simply engage with event representative 506 to register for the event.

In some embodiments, cameras may capture images of attendees and facial recognition software may be used to match the captured images with the stored image of attendees stored in the attendee profile. For example, the virtual attendee described above may check into a virtual event simply by entering the virtual event and allowing the event system to access the virtual attendee's camera 420. Virtual attendee's camera 420 may capture an image of the virtual attendee and the event system may match facial features with the stored image of the virtual attendee associated with the attendee profile. When the facial features are matched to the stored attendee profile image, the virtual attendee may automatically be allowed access to the virtual event.

In some embodiments, facial recognition may be used at in-person event 500. In-person attendee 502 may enter an event venue and camera 516 at in-person event 500 may be set up to capture images of in-person attendee 502. As described above, image data may be obtained by the event hosting system and the event hosting system may match the image data with facial features of the virtual attendee stored on the attendee profile. Similarly, during the in-person event 500, camera 516 may capture image data of in-person attendee 502 which may be compared to attendee profile data to determine the identity of in-person attendee 502. When the identity of in-person attendee is determined a variety of actions may be taken. For example, the event hosting system may automatically check in in-person attendee 502 to the event, send attendance conformation or offers and incentives to the mobile device 514, and the like. The event hosting system may automatically perform various actions to provide in-person attendee 502 with a custom experience. In some embodiments, metadata comprising time, date, location, and the like may be stored with the image data such that arrival and movement of in-person attendee 502 may be tracked.

In some embodiments, the event hosting system may integrate with a GPS receiver of mobile device 514 of in-person attendee 502. The GPS data may be used to determine the location of in-person attendee 502. The event hosting system may access the attendee profile to obtain registration and identity information and verify that in-person attendee 502 is registered for the event when in-person attendee 502 arrives at the event based on the location determined from the GPS data. As such, the event hosting system may automatically check in in-person attendee 502 when in-person attendee 502 is determined to arrive at the venue for in-person event 500.

Similarly, the GPS location of the in-person attendee 502 may be compared to a threshold boundary location associated with in-person event 500 such as a geofence. When in-person attendee 502 crosses the geofence, the mobile application may automatically verify in-person attendee 502 using the attendee profile and registration information and check in in-person attendee 502 to in-person event 500.

In some embodiments, real-time incentives may be awarded to in-person attendee 502 based on the attendee's proximity to and the location in the in-person event 500. The proximity may be determined by any of the above-described detection methods and deals may be sent to in-person attendee 502. For example, in-person attendee 502 may be staying at a hotel associated with the in-person event 500. The event system may notify the attendee that if the attendee upgrades tickets, in-person attendee 502 may receive an upgraded hotel room, extra night stay, and/or any other hotel awards. Furthermore, in-person attendee 502 may receive reduced price tickets and awards for future events.

In some embodiments, the attendance data may be used to provide real-time incentives from the event coordinators and may be provided to sponsors for targeting advertisements to virtual and in-person attendee 502. For example, in-person attendee 502 may be staying in the hotel hosting in-person event 500. Based on the entry to in-person event 500 from the hotel, sponsors 518 may choose to post advertisements at the locations. Furthermore, camera 516, or short-range communication sensors, may capture the attendees entering from the hotel and provide advertisement notifications to in-person attendee 502 entering in-person event 500. Similarly, sensors may be placed at entrances from the street, to stages, sessions, expos, and the like to track in-person attendees and provide real-time incentives.

In some embodiments, the event system may track the attendee using the cameras and the short-range communication as described above. The event hosting system may utilize the facial recognition, short-range communication, and GPS to track the movement of the attendees. The attendees' movements or focus between sessions, workshops, networking engagements and other event content may further provide data for enhancing customized experience for the attendees. For example, in-person attendee 502 may receive a notification upon entry into a lobby of the hotel asking "would you like your usual" from the lobby coffee shop. In-person attendee may select "yes," and an order is immediately sent to the coffee shop for a mocha latte for John. The coffee shop attendant prepares the drink and in-person attendee 502 is notified when the drink is prepared. Similarly, in-person attendant may approach the coffee shop and the coffee shop attendant is notified that "John" is approaching and the John's favorite drink is a mocha latte. The coffee shop attendant may begin preparing or ask John directly "would you like the usual?" This scenario not limited to coffee shops a may be provided for any location in the in-person event 500. In another example, in-person attendee 502 may enter the expo area and be detected by any of the above-described sensors. In-person attendee 502 may receive a map of the expo area detailing each booth and highlighting the booths that may be of interest to in-person attendee 502 based on the attendee profile. In some embodiments, only booths of interest may be sent to in-person attendee to minimize distractions and emphasize efficiency.

In some embodiments, the incentives may be provided for registration, check-in, and attendance at the event and event activities as described above. In some embodiments, points may be provided to the attendees. Points may be earned by any of the above-described methods including attending event activities, time spend at event activities, registration for events, presenting at events, chatting with other attendees, promoting sponsors and products at the events, via social media, and/or on websites. The points may be redeemed for prizes such as, for example, reduced fees for registration to events and event activities, upgraded tickets, free hotel stays, paid travelling expenses, money, and the like.

Figure 6:
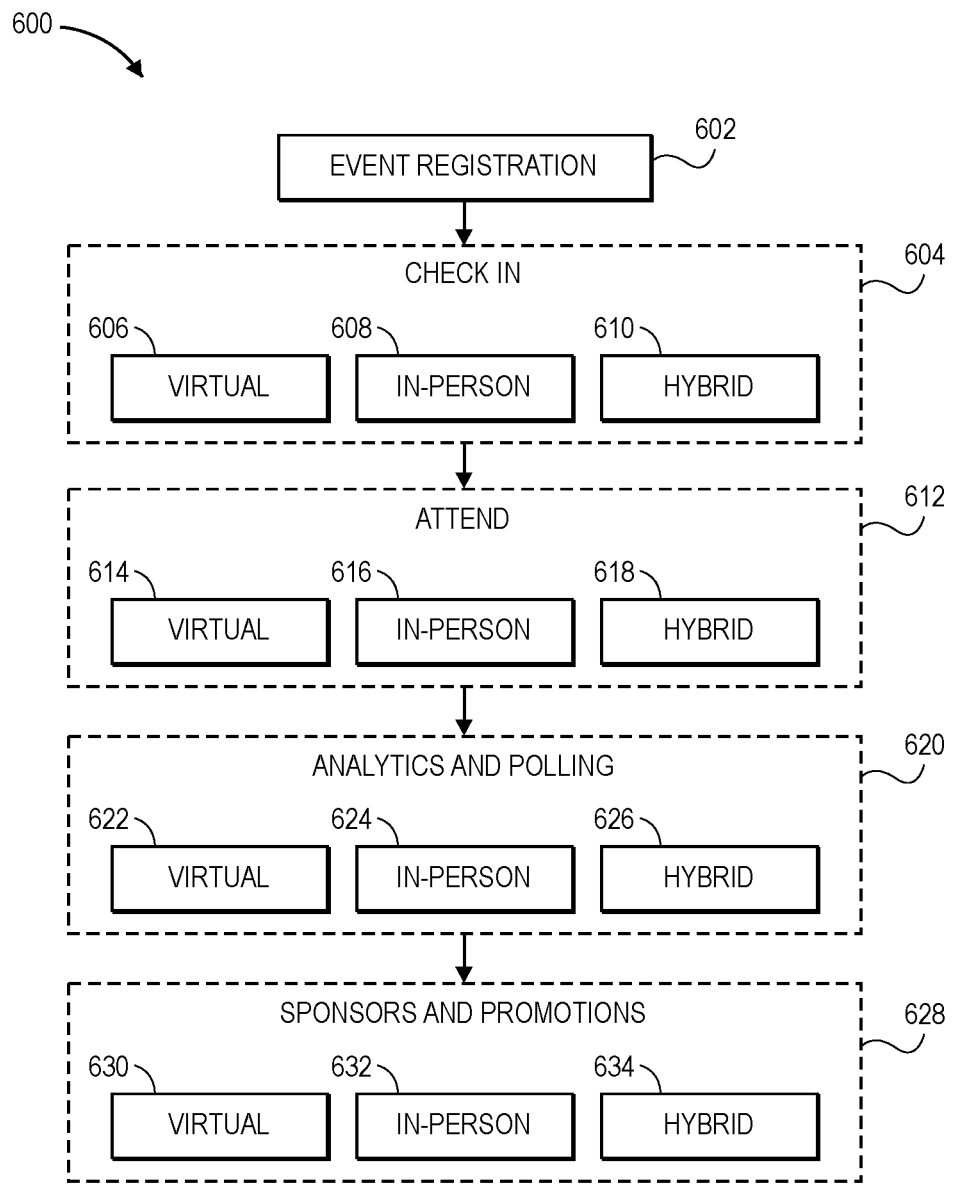
FIG. 6 depicts an exemplary process for registering for and attending an event.

FIG. 6 depicts an exemplary process for registering and attending an event in person, virtually, or in a hybrid format generally referenced by the numeral 600. At step 602 the attendee registers for the event as described in embodiments above. The attendee may register for the event by providing information for the attendee profile such as name, date of birth, contact information, pictures, likes, dislikes, preferences at the event, and the like. The information associated with the attendee profile may be used to provide the attendee with a custom experience at the event. The user may register for the event by selecting a promotional advertisement for the event provided on a third-party site such as a social media site. The user may then receive a promotional code to for a reduced ticket fee based on the provided information associated with the attendee profile or from being directed from the social media site. The attendee may select a single ticket or purchase a plurality of tickets for a plurality of attendees or, if the event is closed or the tickets are sold out, the attendee may be placed on a waitlist. Upon completion of the registration, the attendee may receive a notification of the completed registration along with ticket information and maps and scheduling of the event. The attendee may attend the event in person, virtually, or in hybrid fashion. As such, the attendee may designate an attendance type and the information and promotions provided to the attendee may be catered to the type of registration and access of the attendee. The ticket options and prices may vary based on the registration type.

At step 604, the attendee may check into the event as described in embodiments above. The event hosting system may provide the attendee virtual check-in 606. Virtual check-in 606 may be, for example, a single button check-in where the virtual attendee selects a check-in button, and the event hosting system automatically checks the attendee profile and registration information to verify the attendee and provides access to the event. In some embodiments, the event hosting system may capture an image from virtual attendee's camera 420 and compare the captured image to the stored image of the attendee stored at the attendee profile. Once the identity is verified, the event hosting system may provide access to the event.

In some embodiments, the attendee may check into the in-person event by in-person check-in 608 as described in embodiments above. In-person attendee 502 may check in by signing into a computer, on a paper, or the like. In some embodiments, in-person attendee 502 may check in by communicating with an event representative that may interact with the event hosting system to check in in-person attendee 502. In some embodiments, sensor 512 and/or camera 516 may detect signals from the user such as from, for example, short-range communication signals comprising information indicative of an identity or registration of in-person attendee. The event hosting system, upon receipt of the information, may check in in-person attendee 502. At any point during the conference, in-person attendee may attend any virtual event activities and chat with virtual and other in-person attendees in a hybrid check-in 610.

At step 612, the attendee may attend the event. The virtual attendee may be provided virtual attendance 614 to the event as described in embodiments above. The virtual attendee may attend any of the event activities as shown in FIG. 4 provided on menu 406. The virtual attendee may interact with presenting users and other attendees throughout the event as described in embodiments above. Any interaction of the virtual attendee with the event hosting system may be tracked and used in the analytics and promotions as described herein.

In-person attendee 502, may be provided an in-person experience 616 at in-person event 500 as described in embodiments herein. In-person experience 616 may comprise attending event activities in person while receiving customized in person options, incentives, and promotions as described above. At any point, in-person attendee 502 may instead (temporarily or for the remainder of the event) attend as a hybrid attendee 618 to attend event activities and communicate with other attendees and presenting users from anywhere. All activity of in-person attendee 502 may be tracked and used in analytics and promotions described herein.

At step 620, analytics and polling is provided to and for attendees in virtual analytics 622, in-person analytics 624, and hybrid analytics 626. Data may be collected for registrations, click throughs, third-party applications, single ticket purchases, group ticket purchases, and any other data that may be useful in increasing awareness and sales for future events. Furthermore, attendance data may be collected for any activities of virtual and in-person attendees prior to, during, and post event as described in embodiments above. The data may be analyzed to determine optimal marketing, enhance attendee experiences, and increase awareness and sales of future events. Polls may be provided at any time prior to, during, and post event, to gain insight from the attendees to further better the experiences.

At step 628, sponsors and promotions are provided analytics to update virtual promotions 630, in-person promotions 632, and hybrid promotions 634. Any data and analytics describe in embodiments above may be used to provide attendees with points and promotional codes for future use. The attendees may be awarded reduced prices, and free products and paid promotions to while attending the event and future events. The awards and promotional credits may be provided based on the attendee profile, the attendee attending events and event activities, and the attendee promoting sponsors. Similarly, sponsor may be provided the data and analytics such that the sponsors may provide sponsorships to attendees or may optimize marketing strategies around the events.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method of facilitating registration and check-in for an event, the method comprising:
   receiving, by a user interface and for an attendee, the registration for the event;
   storing registration information and attendee information on an attendee profile associated with the attendee, wherein the attendee information comprises at least one attendee image;
   receiving, by at least one in-venue sensor and without physical contact, at least one image of the attendee;
   receiving, by short-range communication and without physical contact, data indicative of the attendee;
   triggering attendee registration verification based on the receiving of the data indicative of the attendee, the attendee registration verification comprising:
      comparing the at least one image of the attendee with the at least one attendee image based on the data indicative of the attendee;
      matching the at least one image of the attendee with the at least one attendee image stored on the attendee profile; and
      automatically verifying the registration and providing access to the attendee to the event based on the registration information and the matching the at least one image with the at least one attendee image;

tracking movement, actions, and digital interactions of the attendee with a mobile device and/or a computer possessed by the attendee while the attendee is attending a presentation;

computing a level of interest based on the movement, the actions, and the digital interactions of the attendee with the mobile device and/or the computer of the attendee at the presentation;

scheduling, for the attendee based on the level of interest of the attendee at the presentation, a session with a presenter of the presentation, wherein the session comprises a scheduled meeting between the attendee and the presenter;

generating a customized event schedule for the attendee based on the movement, the actions, and the digital interactions of the attendee with the mobile device and/or the computer and the attendee profile and including the session; and providing the customized event schedule to the attendee.

2. The method of claim 1, further comprising:

receiving a single click by a button on the user interface;

providing the registration to the event by the single click; and providing a registration number associated with the attendee profile.

3. The method of claim 1, wherein the attendee is a first attendee, and wherein the event is attended virtually by a second attendee; and the method further comprising verifying the registration of the second attendee by facial recognition.

4. The method of claim 1, wherein the at least one in-venue sensor is a camera, and wherein the event is attended in-person and the camera is disposed at a venue hosting the event.

5. The method of claim 1, wherein the data indicative of the attendee is further obtained by an RFID tag, barcode, QR code, or BLUETOOTH beacon.

6. The method of claim 1, further comprising:

obtaining the data indicative of the attendee from a plurality of sensors;

collecting attendance data for the attendee based on the plurality of sensors; and providing incentives to the attendee based on the attendance data.

7. The method of claim 6, wherein the attendance data is indicative of location, date and time, event activities attended, and an amount of time spent attending the event activities.

8. The method of claim 6, wherein the incentives comprise one of future access to future event activities, reduced price registration for the future event activities, or reduced prices for future events.

9. The method of claim 6, further comprising providing, to sponsors, the attendance data and promoting the sponsors at event activities based on the attendance data.

10. The method of claim 1, further comprising:

receiving additional data indicative of the attendee by at least one secondary sensor of the at least one in-venue sensor; and confirming the registration of the attendee by the additional data and the attendee profile.

11. The method of claim 1, wherein the method further comprises:

receiving additional data indicative of the attendee by at least one secondary sensor of the at least one in-venue sensor; and confirming the registration of the attendee by the additional data and the attendee profile.

12. One or more non-transitory computer-readable media storing computer-executable instructions that, when executed by a processor, perform a method of facilitating registration and check-in for an event, the method comprising:

receiving, by a user interface and for an attendee, the registration for an in-person event;

storing registration information and attendee information on an attendee profile associated with the attendee, wherein the attendee information comprises at least one attendee image;

receiving, by at least one in-venue sensor and without physical contact, at least one image of the attendee;

receiving, by short-range communication and without physical contact, data indicative of the attendee;

triggering attendee registration verification based on the receiving of the data indicative of the attendee, the attendee registration verification comprising:

comparing the at least one image of the attendee with the at least one attendee image based on the data indicative of the attendee;

matching the at least one image of the attendee with the at least one attendee image stored on the attendee profile; and automatically verifying the registration and providing access to the attendee to the event based on the registration information and the matching the at least one image with the at least one attendee image;

tracking, by a plurality of sensors at the event, movement, actions, and interactions with a mobile device and/or a computer possessed by the attendee while the attendee is attending a presentation;

computing a level of interest based on the movement, the actions, and the interactions with the mobile device and/or the computer possessed by the attendee while the attendee is attending the presentation;

scheduling, for the attendee based on the level of interest of the attendee at the presentation, a session with a presenter of the presentation, wherein the session comprises a scheduled meeting between the attendee and the presenter;

generating a customized event schedule for the attendee based on the movement, the actions, the interactions with the mobile device and/or the computer possessed by the attendee, and the attendee profile and including the session; and providing the customized event schedule to the attendee.

13. The media of claim 12, the method further comprising:

receiving a single click by a button on the user interface;

providing the registration to the event by the single click; and providing a registration number associated with the attendee profile.

14. The media of claim 12, the method further comprising:

receiving, via short range communication, a registration number from the attendee by the at least one in-venue sensor at a location of the event; and automatically, confirming the access to event activities to which the attendee is registered based on the attendee profile and the registration number.

15. The media of claim 12, the method further comprising:

obtaining the data indicative of the attendee from the plurality of sensors;

collecting attendance data for the attendee using the plurality of sensors;

providing incentives to the attendee based on the attendance data, wherein the attendance data is indicative of location, a date and a time, event activities attended, and an amount of time spent attending the event activities, wherein the incentives comprise future access to future event activities, reduced prices for registering for the future event activities, reduced prices for future events; and providing, to sponsors, the attendance data and promoting the sponsors at the event activities based on the attendance data.

16. A system for providing virtual registration and access to an event, the system comprising:

a processor;

a data store;

at least one in-venue sensor for obtaining data indicative of an attendee; and one or more non-transitory computer-readable media storing computer-executable instructions that, when executed by the processor, performs a method of facilitating the virtual registration and virtual check-in for the event, the method comprising:

receiving, by a user interface and for the attendee, registration for the event, wherein the registration allows access to event activities of the event;

storing registration information and attendee information on an attendee profile associated with the attendee, wherein the attendee information comprises at least one attendee image;

receiving, by the at least one in-venue sensor and without physical contact, at least one image of the attendee;

receiving, by short-range communication and without physical contact, data indicative of the attendee;

triggering attendee registration verification based on the receiving of the data indicative of the attendee, the attendee registration verification comprising:

comparing the at least one image of the attendee with the at least one attendee image based on the data indicative of the attendee;

matching the at least one image of the attendee with the at least one attendee image stored on the attendee profile; and automatically verifying the registration and providing access to the attendee to the event based on the registration information and the matching the at least one image with the at least one attendee image;

tracking movement, actions, and digital interactions with a mobile device and/or a computer possessed by the attendee while the attendee is attending a presentation;

computing a level of interest based on the movement, the actions, and the digital interactions with the mobile device and/or the computer possessed by the attendee while the attendee is attending the presentation;

scheduling, for the attendee based on the level of interest of the attendee at the presentation, a session with a presenter of the presentation, wherein the session comprises a scheduled meeting between the attendee and the presenter; generating a customized event schedule for the attendee based on the actions and including the session; and presenting the customized event schedule to the attendee.

17. The system of claim 16, the method further comprising:

obtaining attendance data indicative of the event activities attended and time spent at the event activities;

analyzing the attendance data; and providing incentives to the attendee based on the attendance data.

18. The system of claim 17, wherein the method further comprises suggesting future events to the attendee based on the attendance data.

19. The system of claim 18, wherein the method further comprises providing the attendance data to sponsors for targeted advertising.

20. The system of claim 16, at least one additional sensor of a plurality of in-venue sensors; and wherein the method further comprises:

receiving additional data indicative of the attendee by the at least one additional sensor of the at least one in-venue sensor; and confirming the registration of the attendee by the additional data and the attendee profile.

* * * * *